United States Patent [19]
Vermilion et al.

[11] Patent Number: 5,992,628
[45] Date of Patent: Nov. 30, 1999

[54] ASPHALT PACKAGES WITH CONSUMABLE CONTAINERS

[75] Inventors: Donn R. Vermilion, Newark, Ohio; John L. Buc, Des Plaines, Ill.; Jon S. Wright, Colombus, Ohio; Jorge A. Marzari, Bolingbrook, Ill.; Jeremy Campbell; Frederick H. Ponn, both of Newark, Ohio; Frank L. Burg, Portland, Oreg.

[73] Assignee: Owens Corning Fiberglas Technology, Inc., Summit, Ill.

[21] Appl. No.: 08/990,011

[22] Filed: Dec. 12, 1997

Related U.S. Application Data

[63] Continuation-in-part of application No. 08/810,882, Mar. 5, 1997, Pat. No. 5,765,686.

[51] Int. Cl.[6] .................................................. B65D 5/54
[52] U.S. Cl. ...................................... 206/447; 206/524.1
[58] Field of Search ............................... 206/447, 524.1, 206/524.3, 524.6, 524.7, 509, 569, 557, 561, 564, 521.15, 219; 220/555, 556; 229/120.011

[56] References Cited

U.S. PATENT DOCUMENTS

| | | |
|---|---|---|
| 619,810 | 2/1899 | Upham . |
| 3,307,739 | 3/1967 | Cloyd et al. . |
| 3,521,788 | 7/1970 | Kandel et al. . |
| 3,759,416 | 9/1973 | Constantine . |
| 3,854,582 | 12/1974 | Martinelli . |
| 3,902,596 | 9/1975 | McVay . |
| 3,908,891 | 9/1975 | Jackson . |
| 4,279,354 | 7/1981 | Conti ........................................ 220/555 |
| 4,318,475 | 3/1982 | Robinson . |
| 4,343,400 | 8/1982 | Faucillon ................................ 220/555 |
| 4,428,493 | 1/1984 | McDonough ........................... 220/555 |
| 4,512,493 | 4/1985 | Von Holdt . |
| 4,826,016 | 5/1989 | Foster . |
| 4,848,580 | 7/1989 | Wise . |
| 5,083,674 | 1/1992 | Clark . |
| 5,307,608 | 5/1994 | Muir et al. . |
| 5,452,800 | 9/1995 | Muir . |
| 5,566,852 | 10/1996 | Emery ..................................... 220/556 |
| 5,733,616 | 3/1998 | Janicki et al. .......................... 206/447 |
| 5,765,686 | 6/1998 | Wright et al. ........................... 206/447 |

FOREIGN PATENT DOCUMENTS

| | | |
|---|---|---|
| 1145924 | 3/1969 | United Kingdom . |
| 1379246 | 1/1975 | United Kingdom . |
| WO 96/40838 | 12/1996 | WIPO . |

Primary Examiner—Paul T. Sewell
Assistant Examiner—Luan K. Bui
Attorney, Agent, or Firm—Inger H. Eckert

[57] ABSTRACT

Asphalt is packaged in consumable containers (10) having breakage means, such as short notches or long channels (110, 111), to allow for easy breakage into smaller portions for ease of handling and feeding into kettles. The containers are advantageously made of an asphalt-polymer composition so that the entire asphalt package may be melted in a kettle, e.g., for use in a roofing or paving application. The containers may have various features to enhance processability and handleability, including a generally rectangular shape and multi-faceted or stepped sides 20 and/or walls 30 with handhold portions and/or scooped portions.

20 Claims, 13 Drawing Sheets

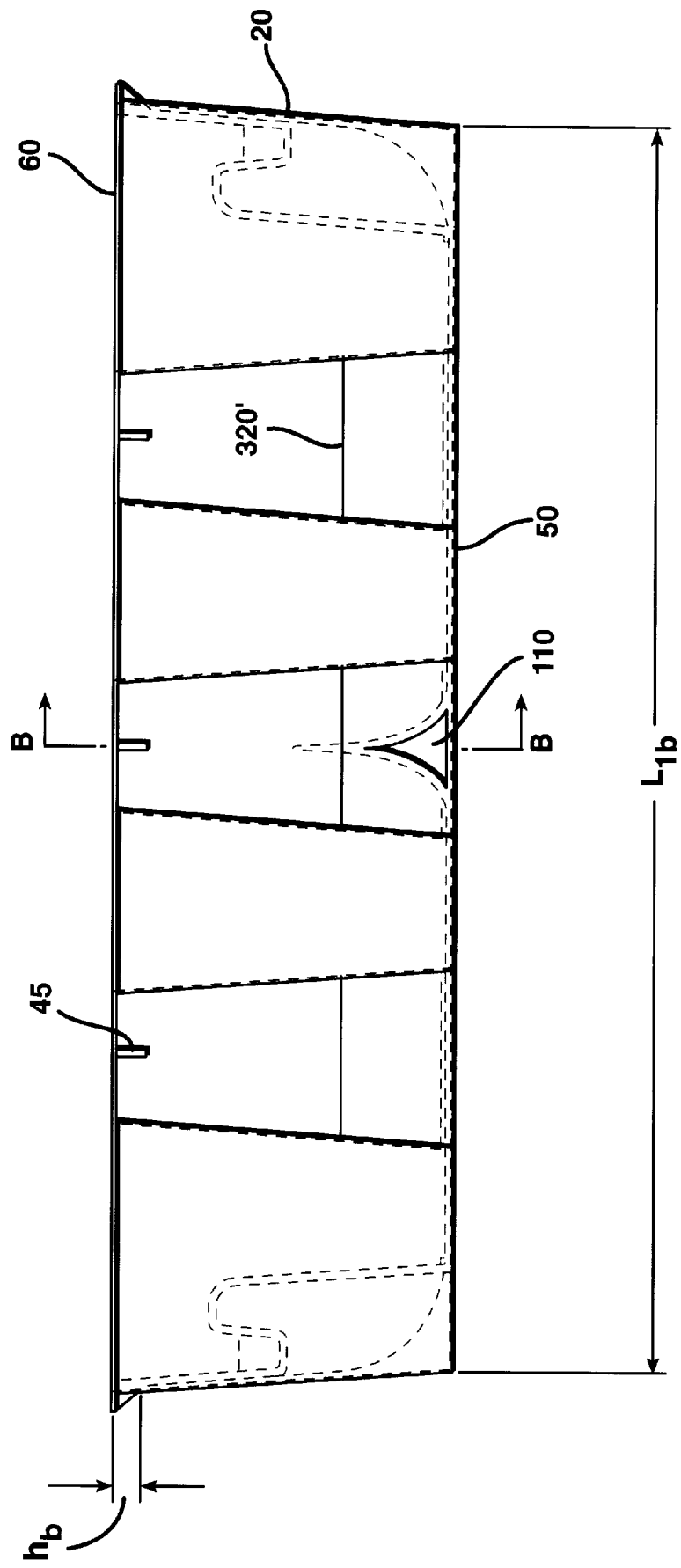

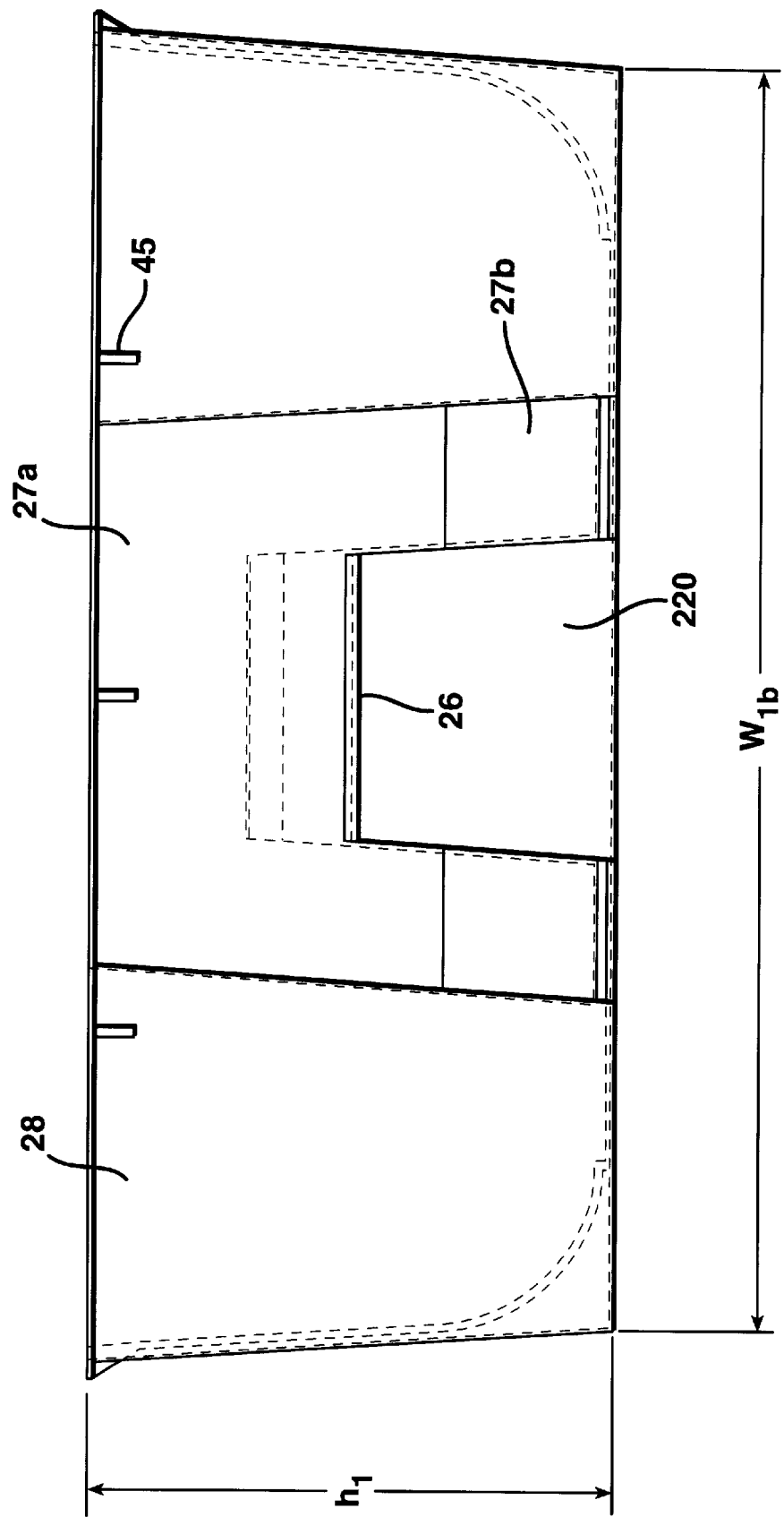

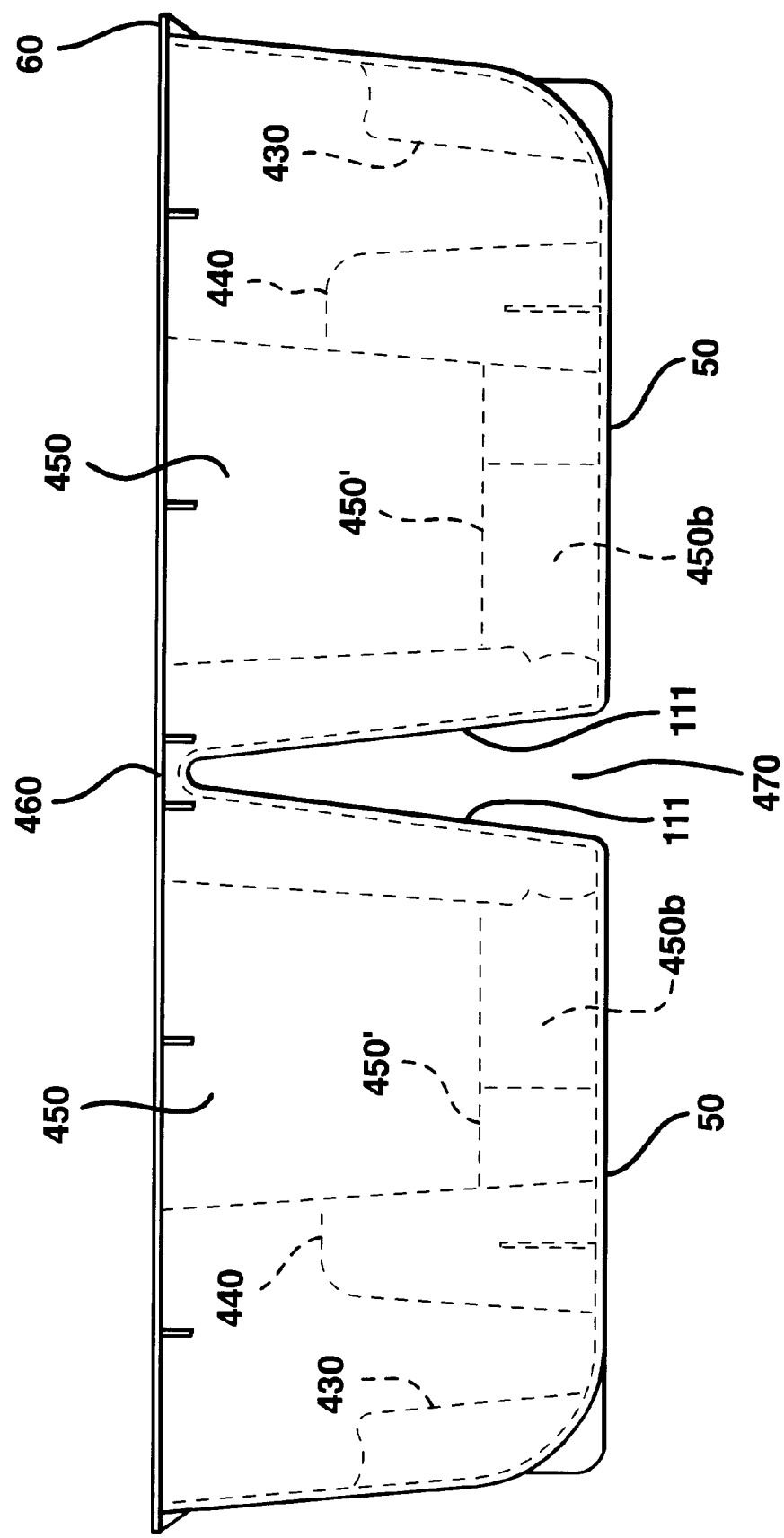

ASPHALT PACKAGES WITH CONSUMABLE CONTAINERS

CROSS-REFERENCE TO RELATED APPLICATIONS

This application is a continuation-in-part of application Ser. No. 08/810,882 filed Mar. 5, 1997, U.S. Pat. No. 5,765,686.

TECHNICAL FIELD AND INDUSTRIAL APPLICABILITY OF INVENTION

The invention relates to improved containers for packaging asphalt for use in applications such as roofing and paving. The invention is also related to asphalt packages that are fully consumable by the user—the containers may be melted along with the asphalt therein for use in roofing, paving, and the like.

BACKGROUND OF THE INVENTION

In the asphalt industry, one way of transporting asphalt to the users is in the form of individual packages, which are used often by building contractors as a source of asphalt for roofing and other construction applications. Individual packages of asphalt are often formed at conventional asphalt-processing facilities by pouring molten asphalt into containers made of a metal bottom and paper cylindrical sidewalls. The asphalt is typically poured at temperatures of about 177° C. and the packages are allowed to cool for up to twenty-four hours prior to shipping to users, such as roofing contractors. After removing the paper and metal container, which become waste, the roofing worker places the solid asphalt from the container in a gas-fired melting kettle to melt the asphalt for application. Removal of the paper and metal container is time-consuming and the disposal of the paper and metal container material is burdensome.

Packages have been developed that eliminate the need to remove or dispose of the container. One type of such a package is disclosed in, e.g., U.S. Pat. Nos. 5,452,800 and 5,307,608, which relate to asphalt packages employing thin polypropylene films as the sole containment means and methods for their manufacture.

Another type of consumable asphalt package that has been developed is a moldable container described in International Publication No. WO 96/40838, the disclosure of which is incorporated by reference herein. The consumable containers molded from compositions comprise asphalt and polymer material. The containers may be of cylindrical or rectangular designs, and may be tapered for stacking and include such features as handholds to facilitate handling and annular protrusions or circumferential ribs to enhance dimensional stability.

Although moldable consumable containers have been attained, which have an advantage of reducing fuming in an asphalt-melting kettle, further improvements are desired. More particularly, improvements are sought to facilitate the processing of the containers into asphalt packages as well as the use of the packages.

SUMMARY OF THE INVENTION

Accordingly, an object of the invention is to provide an asphalt container that is convenient to handle in manufacture and use. An additional object is to provide a consumable container that is freestanding, strong, and makes efficient use of materials of which it is composed. Another object of the invention is to provide a consumable asphalt container that is sturdy and safe to handle. A further object is to provide a container that will reliably hold a convenient amount of asphalt, and which can be readily broken into smaller segments for even more convenient handling by the user at the job site. Another object is to provide a container that can withstand, without substantial deformation, temperatures at which molten asphalt is poured into the container. Another object is to provide an asphalt container that better facilitates cooling of molten asphalt therein. An additional object of the invention is to provide a consumable asphalt container that stacks neatly when both empty and full. These and other objects are achieved by the containers according to the invention.

An asphalt package of the invention comprises: (a) a container made from a consumable composition comprising an asphalt material and at least one polymer, the container having a structure comprising (i) a bottom having opposing side edges and opposing end edges, (ii) a pair of side walls extending up from the side edges of the bottom and connecting (iii) a pair of end walls extending up from the end edges of the bottom to define a top perimeter, with the bottom, side walls, and end walls defining a container interior, and (iv) at least one indented breakage means extending up toward the container interior, away from one side wall at least partially across the bottom toward the opposing side wall, and at an angle to one end wall; and (b) asphalt in the container interior. In a preferred embodiment, the breakage means comprises a first break notch extending to a point less than half way across the bottom, and the angle of notch with respect to the end wall is 90°. More preferably, the breakage means further comprises a second break notch across from the first break notch and extending up toward the container interior, away from the opposing side wall at least partially across the bottom, and at an angle of 90° to the end walls.

In another preferred embodiment, the breakage means comprises a break channel extending from the one side wall to the opposing side wall, preferably at an angle of from 45° to 90°, such as a right angle. Preferably, such channels extend upwardly from about 50% to about 95% of the height of the side wall, more preferably from about 85% to about 95% of the side wall height, and preferably extends to near, or even slightly above, the top of the asphalt in the container. Further, such breakage channels preferably have a triangular or U-shaped cross-section.

The containers may advantageously include additional features. For example, the side walls and end walls may comprise a plurality of tiers including a top tier and one or more lower tiers, with the top tier overhanging the lower tier(s). The container end walls may also include horizontal handhold portions and the side walls include vertical handhold portions.

Each of the end walls may include a recessed end surface centered widthwise and having a quadrilateral shape, the recessed end surface extending from the bottom to a point below the top perimeter of the container thereby defining a handhold portion between the top perimeter and the recessed end surface. The handhold portion may comprise an outer channel opening toward the top perimeter and an inner channel opening toward the bottom. The handhold portion preferably bridges together leg portions on each end wall, the handhold portion and leg portions forming an outer end surface surrounding three sides of the recessed end surface. The leg portions may have curved bases or scooped sections curving inwardly to the bottom.

Each side wall may include at least two recessed side surfaces spaced apart lengthwise and having a quadrilateral shape, the recessed side surfaces each extending from the bottom to a point below the top perimeter of the container thereby defining a horizontal portion between the top perimeter and the recessed side surface. Preferably, the horizontal portion bridges together leg portions on each side wall, the horizontal and leg portions forming an outer side surface surrounding three sides of each recessed side surface. In a preferred embodiment, the container sides include both handhold portions and scooped portions (e.g., curved leg portions).

The container structure may further comprise a rim extending outwardly around the top perimeter. A plurality of spaced-apart ribs extending from the rim to the side walls and a plurality of spaced-apart ribs extending from the rim to the end walls may be provided for reinforcement.

In preferred embodiments, the asphalt packages further comprise a film made of a polymer material covering the asphalt after it has been introduced into the container. Preferably, the film overlying the asphalt surface has a thickness of from 1 mil to 4 mils, and the polymeric material is polypropylene.

The containers are preferably made from a consumable composition comprising, by weight, from about 40% to about 90% asphalt and from about 10% to about 60% total polymer(s). In a preferred consumable container composition, AC-20 oxidized to a softening point of 250° F. is combined with polypropylene and ethylene-vinylacetate polymers.

Other features and advantages of the invention will become apparent from the detailed description in conjunction with the drawings.

BRIEF DESCRIPTION OF THE DRAWINGS

FIG. 1c is a side view of the embodiment of FIG. 1a;

FIG. 1e is an end view of the embodiment of FIG. 1a.

FIG. 7b is a front view of the quadrant shown in FIG. 7a.

FIG. 8b is a side view of the embodiment of FIG. 8a.

FIG. 8c is a bottom view of the embodiment of FIG. 8a.

DETAILED DESCRIPTION AND PREFERRED EMBODIMENTS OF THE INVENTION

Figure 1A:
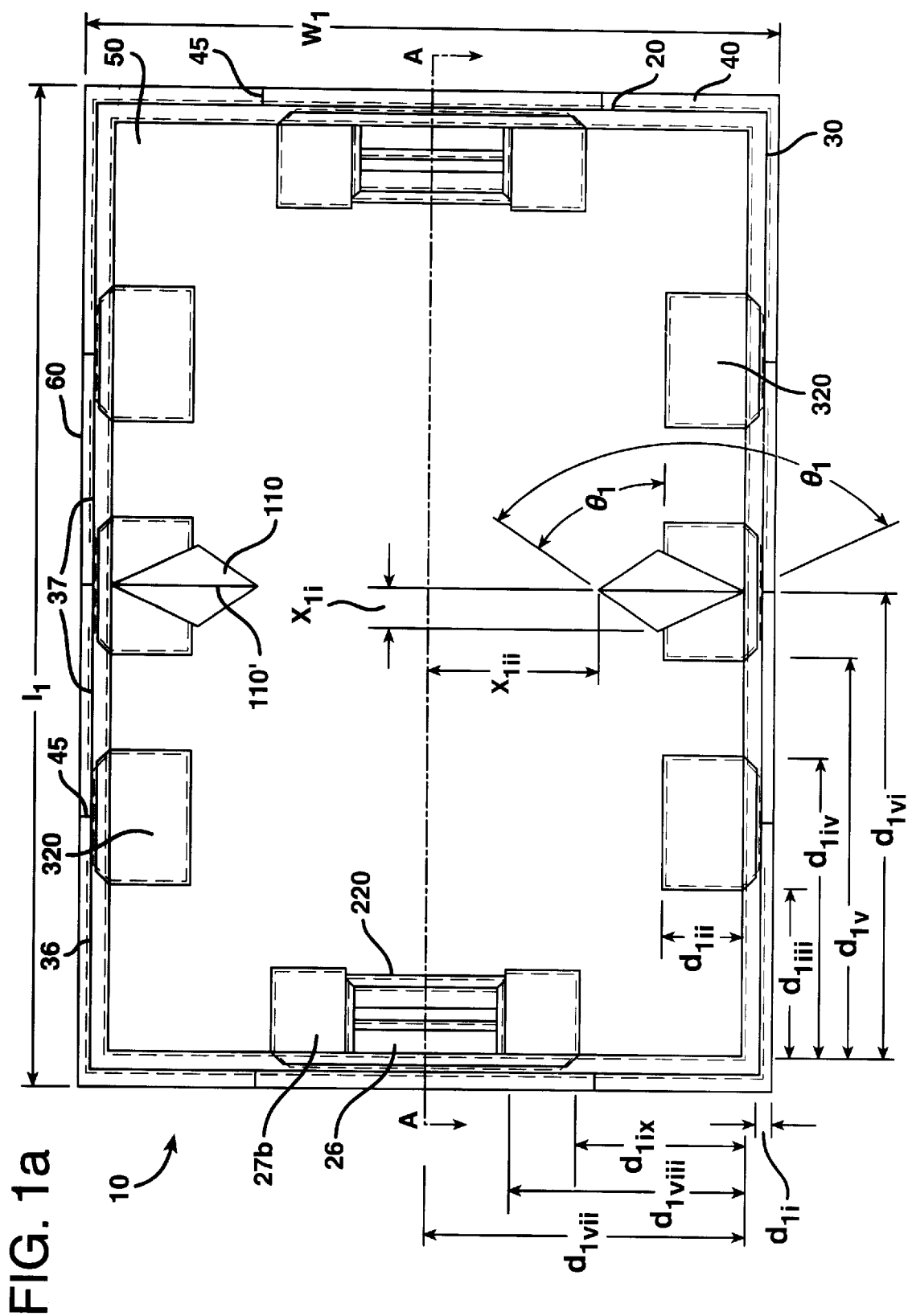
FIG. 1a is a bottom view of a preferred embodiment of an asphalt container according to the invention.
Figure 1B:
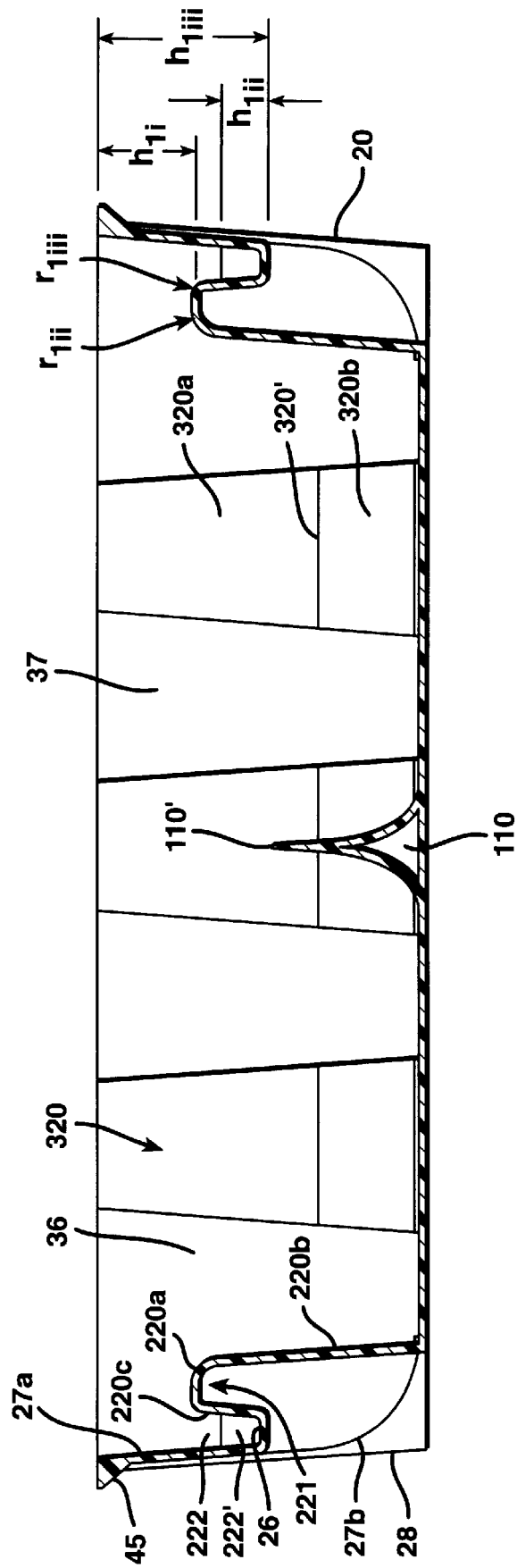
FIG. 1b is a cross-sectional view of the embodiment of FIG. 1a taken along line A—A thereof.
Figure 1D:
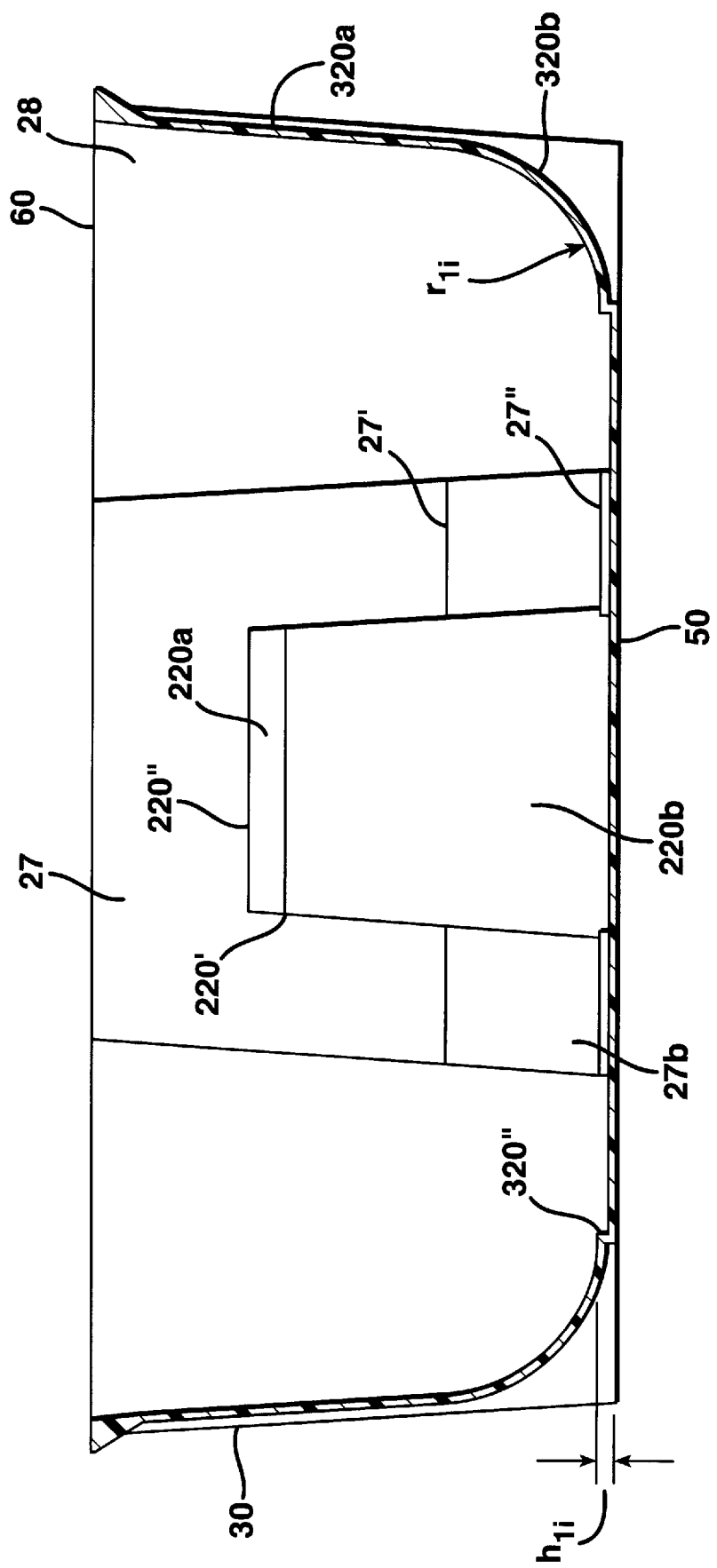
FIG. 1d is a cross-sectional view taken along line B—B of FIG. 1c.

In general, containers 10 according to the invention, such as those depicted in the drawing figures (in which like reference numbers refer to like elements), have a generally quadrilateral, e.g., rectangular, cross-sectional shape, with opposing ends or end walls 20 connecting opposing sides or side walls 30. Preferably, the containers are configured such that they are stackable when empty or filled with asphalt. The containers 10 are filled with asphalt 15 (see FIG. 7b) to form an asphalt package 5. The containers may be advantageously provided with break notches 110 or channels 111 to facilitate breakage by the user at the job site into smaller and lighter packages for more convenient handling and feeding to the kettle for melting. The break notches 110 or channels 111 also may serve as expansion joints to help avoid distortion of the container upon filling with molten asphalt, which may be poured or pumped into the container at a temperature of about 330° F. The containers may also include recessed or faceted faces or surfaces on sides 30 and/or ends 20, which may provide handle or handhold portions as well as facilitate cooling of hot asphalt, to yield a strong, reliable package that may be conveniently handled. The surfaces may include curved or scooped portions to enhance structural integrity of the container when filled with asphalt.

In the especially preferred design shown in FIGS. 1a–1e, container 10 has end and side walls 20, 30 that taper from top 60 to bottom 50, which has a central flat surface. Preferably, the container has an overall length ($l_1$) of about 23.11 inches, an overall width ($w_1$) of about 16.36 inches, and an overall height ($h_1$) of about 6.150 inches. The dimensions of the container around the perimeter of the bottom surface 50 are preferably about 21.65 inches long ($l_{1b}$) by about 15.15 inches wide ($w_{1b}$). Unless indicated otherwise, the thickness of the container walls is generally about 0.075 inch.

The container walls have curved or scooped recess sections or portions 220, 320, which help resist bulging or deformation during filling with hot asphalt. Three recessed sections 320 are provided on each side 30, forming two outer leg portions 36 and two inner leg portions 37. Section 320 has top and bottom portions 320a, 320b, with the top portion 320a being slightly inset or recessed from the outermost surface of side wall 30 and tapering to apex line 320', from where the lower portion 320b curves or scoops inward toward the center of container bottom 50 to a point 320" from which it vertically progresses down to the container bottom 50. Preferably, the radius ($r_{1i}$) of curved portion 320b is about 0.95 inch and the height ($h_{1i}$) of the drop from the end of the curve to the container bottom surface 50 is about 0.200 inch. Other preferred dimensions referred to in the drawings in conjunction with recesses 320 are approximately as follows: $d_{1i}$=0.375 inch; $d_{1ii}$=2.000 inches; $d_{1iii}$= 3.950 inches; $d_{1iv}$ =6.950 inches; $d_{1v}$=9.325 inches; and $d_{1vi}$=10.825 inches.

Each end 20 has several offset surfaces or facets, including a centered recessed wall portion 220, which is recessed inward from and surrounded by inner surrounding wall portion 27, which in turn is recessed inward from outer wall portions 28. Wall portion 27 includes a horizontal upper section bridging vertical side sections having a flat, tapered upper portion 27a that transitions at line 27' into lower portion 27b, which curves inwardly to line 27", at which point wall portion drops vertically to the container bottom 50. The middle recessed portion 220 of end wall 20, which protrudes upward into the container interior when viewed from the top, has a flat lower portion 220b tapering outward up to a curved or scooped upper portion 220a, which curves from line 220' up to line 220", at which point end wall 20 extends vertically downward at surface 220c to ledge 26. When viewed from the bottom, wall surfaces 220b, 220a, and 220c form a channel 221 opening toward the container bottom, facilitating grasping by hand. When viewed from the top, surfaces 220c, 26, and 27a form upward-opening channel 222, which is preferably bounded on its ends by vertical walls 222'. Preferred dimensions referred to in the drawings in conjunction with the end formations including grasping means are approximately as follows: $d_{1vii}$=7.575 inches; $d_{1viii}$=5.575 inches; $d_{1ix}$=4.000 inches; $h_{1i}$=1.808 inches; $h_{1ii}$=0.825 inch; $h_{1iii}$=3.150 inches; $r_{1ii}$=0.48 inch; and $r_{1iii}$=0.14 inch.

A break notch 110 is centered along each opposing side 30. The notch extends vertically mid-side to apex line 110', and has a side cross-section in the shape of a teepee or curved-isosceles triangle (see FIG. 1b) and a bottom cross-section in the shape of a kite or diamond (see FIG. 1a). Preferred dimensions associated with notch 110 are approximately as follows: $x_{1i}$=1.000 inch; $x_{1ii}$=4.000 inches; $\theta_1$=55°; and $\Phi_1$=120°.

The container has a rim or flange 40 around its top perimeter 60. Buttresses or ribs 45, which are preferably triangular in shape, extend under the rim 40. In the embodiment illustrated in FIGS. 1c and 1e, twelve buttresses 45 are provided, each having a height ($h_b$) of about 0.500 inch and a thickness of about 0.075 inch. The buttresses 45 are preferably spaced apart along side wall 30 at a distance (from rib to rib) of about 5.38 inches and along end wall 20 at a distance of about 4.000 inches.

In another preferred embodiment, a consumable container is made having a structure like that shown in FIGS. 1a–1e, except that handholds like those provided in ends 20 are provided in sides 30. Thus, in this alternative embodiment, both the ends 20 and the sides 30 have handhold portions and scooped portions, to provide a strong container that is readily handled.

Figure 2:
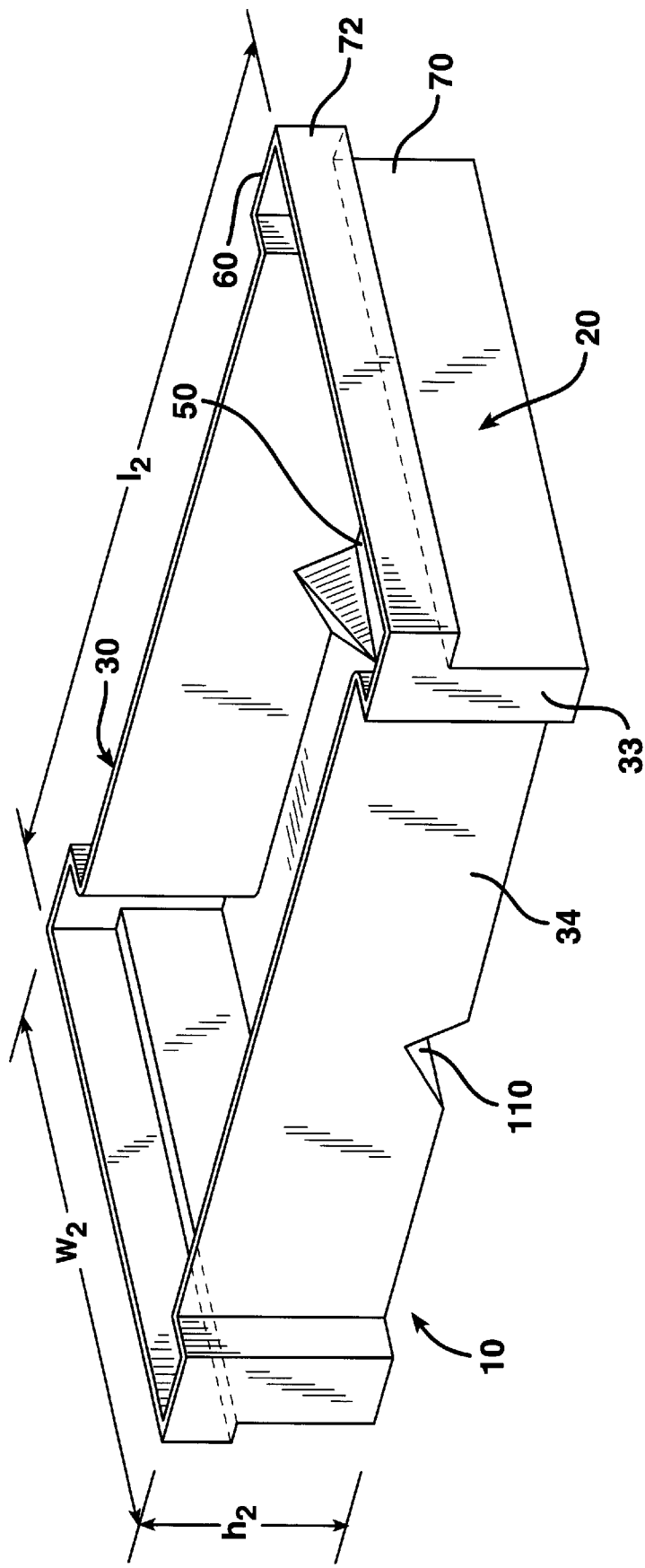
FIG. 2 shows another embodiment of an asphalt container.

FIG. 2 shows an alternative embodiment of a container 10 having a break notch or wedge 110 centered at the bottom of each side 30, which preferably extends partially across the width of the container bottom 50 to a point about ⅔ the way to the center of the bottom. Leaving a flat surface in the center of the bottom 50 facilitates gating of the container mold in the middle to provide for convenient forming of the container. Additionally, the notches 110 may serve as expansion joints during pouring of hot asphalt into the container 10 to form a package, helping maintain the structural integrity of the container while the asphalt solidifies upon cooling. Furthermore, the notches 110 help enhance cooling by increasing the surface area exposed to the cooling fluid (e.g., ambient air or cooling water). The container design facilitates not only container and package preparation, but also package use—the notches 110 allow for convenient breakage of the asphalt package into halves and the flat surface around the center of the bottom 50 allows the operator to readily slide the asphalt package, in its entirety or in portions, into the kettle without providing areas that readily catch on the edge of the kettle.

A horizontal handhold is provided on each container end 20 by means of an overhanging upper tier or ledge 72 above a lower recessed tier 70. In this embodiment, vertical handholds are also provided by means of a recessed central portion 34 in each side 30 between outer legs or portions 33, which preferably have an inverted L-shape so that they may be grasped horizontally or vertically by the user. In addition to providing handles or handgrips, the multiple facets or recessed surfaces in sides 30 and ends 20 help enhance processing of the containers into asphalt packages by increasing the heat-transfer surface area for improved cooling of molten asphalt packaged in the containers.

The container 10 is preferably dimensioned so that it will hold about 60 pounds of asphalt at 330° F., leaving a clearance of about 0.5 inch from the level of the asphalt to the container top 60. Especially preferred dimensions of the container embodiment of FIG. 2 are approximately as follows: overall height ($h_2$) of from 6 to 8 inches, with the height of the overhanging tier or handhold 72 being from 2 to 3 inches; an overall width ($w_2$) of from 12 to 15 inches, with the distance between recessed face 34 and outer faces 33 of each side 30 being from 0.75 to 1 inch; and an overall length ($l_2$) of from 20 to 22 inches, with the length of the top of the L-shaped portion 33 being from 2 to 3 inches and the length of the base of the triangular cross-section of the break notch 110 being 1.5 inches. Preferably, the container bottom 50 has a thickness of from about 60 to about 80 mils (1 mil=1×10$^{-3}$ inch), more preferably about 75 mils, and the end and side walls 20, 30 have a thickness of from about 70 to about 90 mils, more preferably about 75 mils.

The container 10 is filled with asphalt, preferably to a level or fill line about 0.5 inch below the top 60 of the container. Preferably, the package has a total weight of from about 40 to about 75 pounds, more preferably of about 60 pounds.

Figure 3:
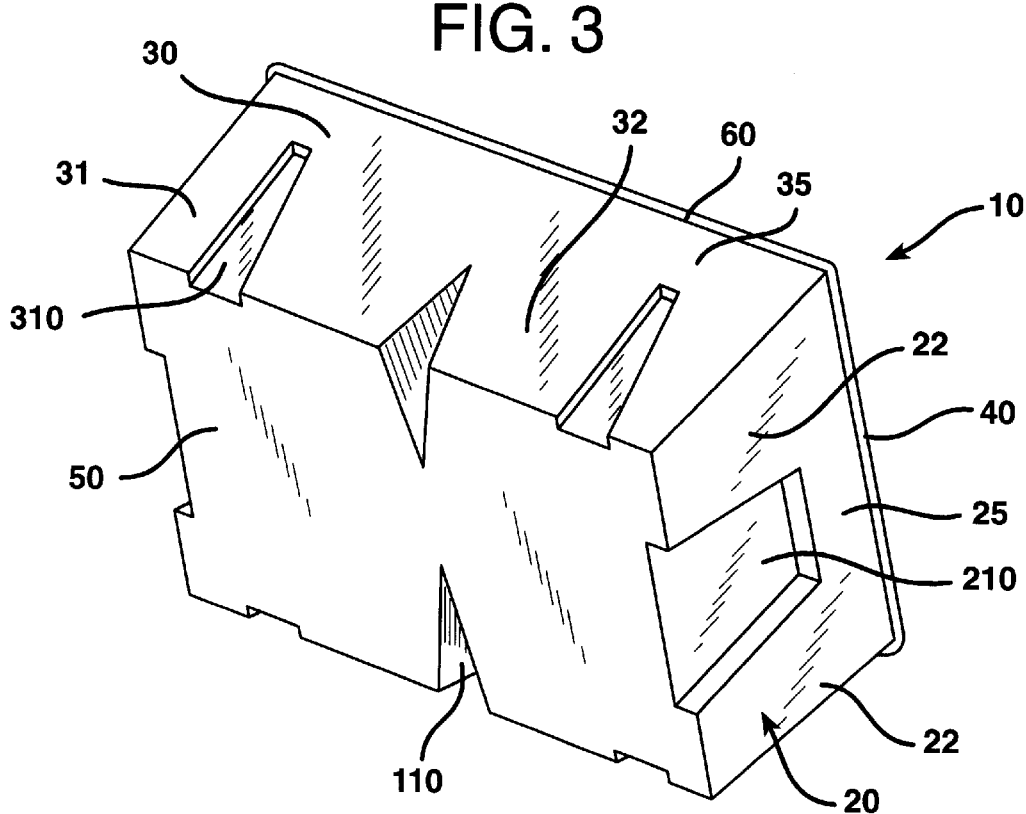
FIG. 3 illustrates of an alternative embodiment of an asphalt container.

FIG. 3 shows another design of a container 10 having break notches 110 and a rim or flange 40 along the top perimeter 60. A depression or indentation 210, preferably in the shape of a trapezoid, is provided on each end 20, forming a handbridge section 25 connecting end leg sections 22. Similar depressions 310 may be provided on sides 30, such as two on each side 30 forming short leg sections 31 and large leg sections 32 connected by handbridge sections 35. The depressions 310 are preferably spaced from sides 20 to form vertical handholds via the short legs, which may be grasped. The container also may be conveniently grasped by the user via handbridges 25, 35, e.g., with the fingers of a hand extending into a depression 210, 310 under a handbridge and the thumb wrapping around rim 40 (or vice-versa). The depressions and handbridges may also be used to mechanically grasp the container, e.g., with large tongs. The surfaces of bottom 50 and end and side walls 20, 30 are essentially flat or planar (without any curved or scooped portions) in this embodiment.

Figure 4:
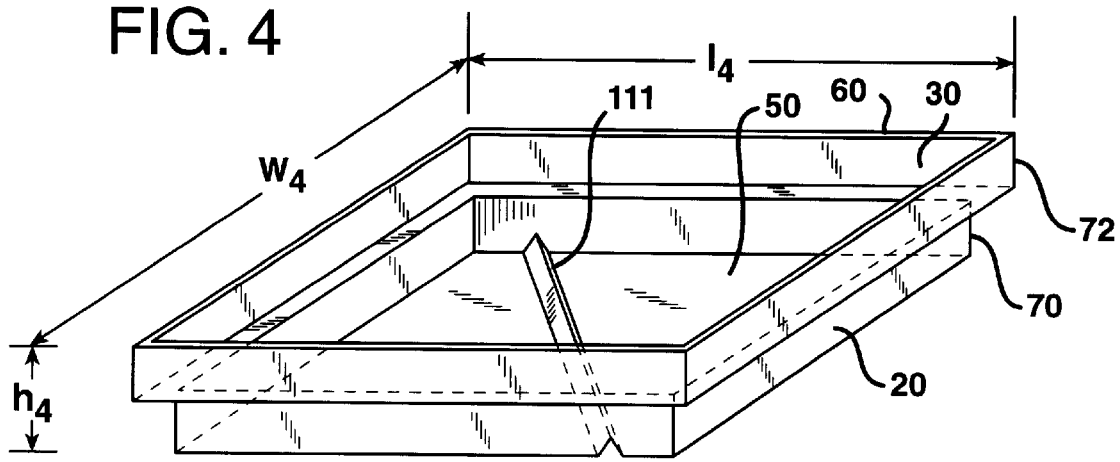
FIG. 4 depicts an additional embodiment of an asphalt container of the invention.
Figure 5:
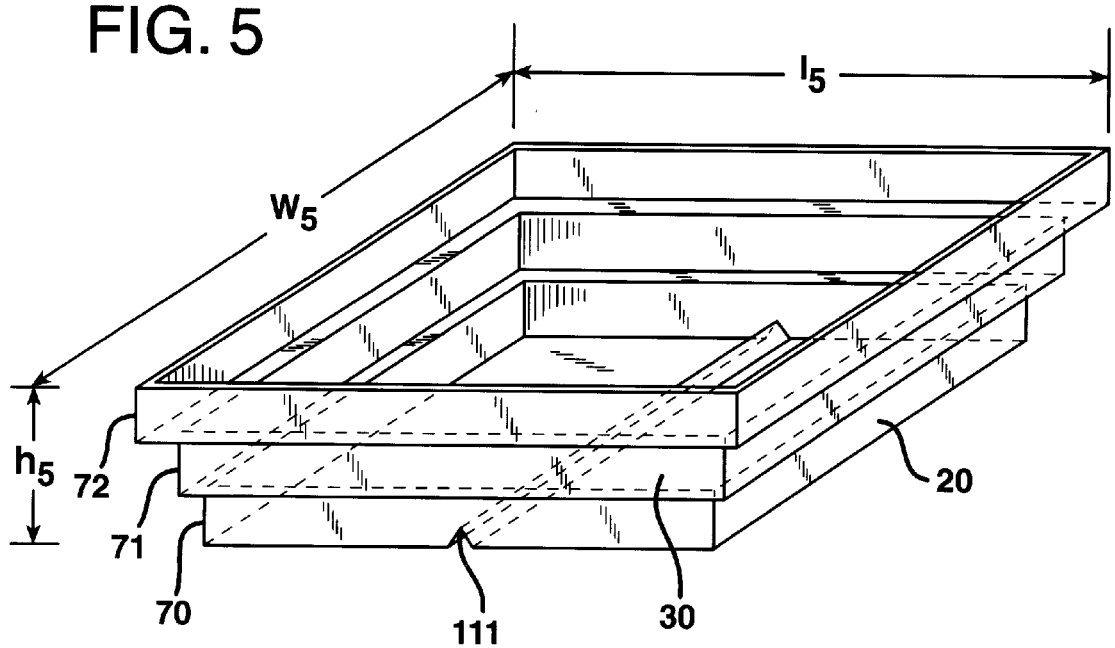
FIG. 5 illustrates a further embodiment of an asphalt container.
Figure 6:
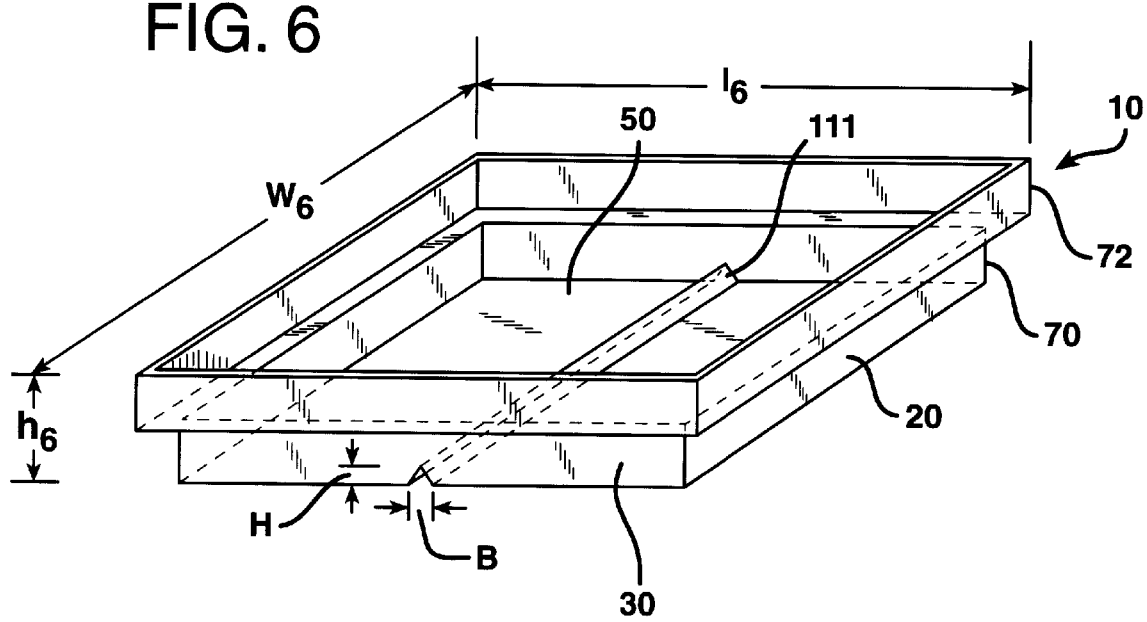
FIG. 6 shows another embodiment of a container for asphalt.

FIGS. 4–6 show different embodiments of rectangular containers with handholds formed by stepped walls (overhanging tiers or levels) and a v-shaped break channel or groove bisecting the container bottoms. In the rectangular container illustrated in FIG. 4, a break indentation 111 extends at an angle to walls 20 and spans the width of the container bottom 50. The angled or diagonal channel 111 should help avoid catching of the container bottom 50 on a kettle edge in comparison with the right-angle channel if it is desired to add the entire package to the kettle. Moreover, if the package is broken into halves along break line 111, the break line of this embodiment, as compared to an embodiment having a break line parallel to ends 20, enhances operator safety, e.g., by allowing the operator to grasp one pointed end at the end along break line and lower the other pointed end down into the kettle, which helps reduce splashing of molten asphalt by virtue of the more aerodynamic (pointed-edged vs. flat-edged) entry of the package half into the molten asphalt and the longer distance the package can be lowered into the kettle before the operator must release it.

The embodiment of FIG. 4 has two horizontal tiers, with top tier 72 overhanging bottom tier 70 height to form a handhold for grasping the container anywhere along the entire top perimeter 60. Preferably, the container has the following approximate dimensions: overall height ($h_4$) of 6 inches, with each tier height being 3 inches; overall width ($w_4$), which is the top-tier width, of 15.5 inches, with a bottom-tier width of 14.5 inches; and overall length ($l_4$), which is the top-tier length, of 22 inches, with a bottom-tier length of 20 inches. The break groove 111 preferably has a cross-section in the shape of an inverted v or triangle (considering the gap along the bottom as the triangle base) with a base length along bottom gap (B, see dimension depicted in FIG. 6) of from about 1 inch to about 2 inches and a height (H) of from 1 inch to 2 inches, more preferably a base length and height each of about 1 inch.

FIG. 5 shows a three-tiered rectangular container having a break line or channel 111 parallel to ends 20, centered along sides 30, and spanning the width of the container bottom 50. The tiers are stepped, with top tier 72 overhanging middle tier 71, which overhangs bottom tier 70, to form handholds for grasping the container. Preferably, the container has the following approximate dimensions: overall height ($h_5$) of 6 inches, with each tier height being 2 inches; overall width ($w_5$), which is the top-tier width, of 16.5 inches, with a middle-tier width of 15.5 inches and a bottom-tier width of 14.5 inches; and overall length ($l_5$), which is the top-tier length, of 22.75 inches, with a middle-tier length of 21.75 inches and a bottom-tier length of 20.75 inches. The break groove 111 preferably has a cross-sectional shape of an isosceles triangle with a base (gap) length of 1 inch and a height of 1 inch.

FIG. 6 shows a stepped rectangular container design with a break line or groove 111 parallel to walls 20, centered along side 30, and spanning the width of the container bottom 50. The container has two tiers, with top tier 72 overhanging bottom tier 70 to form a handgrip. Preferably, the container has the following approximate dimensions: overall height ($h_6$) of 6 inches, with each tier height being 3 inches; overall width ($w_6$), which is the top-tier width, of 15.5 inches, with a bottom-tier width of 14.5 inches; and overall length ($l_6$), which is the top-tier length, of 22 inches, with a bottom-tier length of 20 inches. The break groove 111 preferably has a cross-sectional shape of an inverted v with a base length (B) of 1 inch and a height (H) of 1 inch.

Figure 7A:
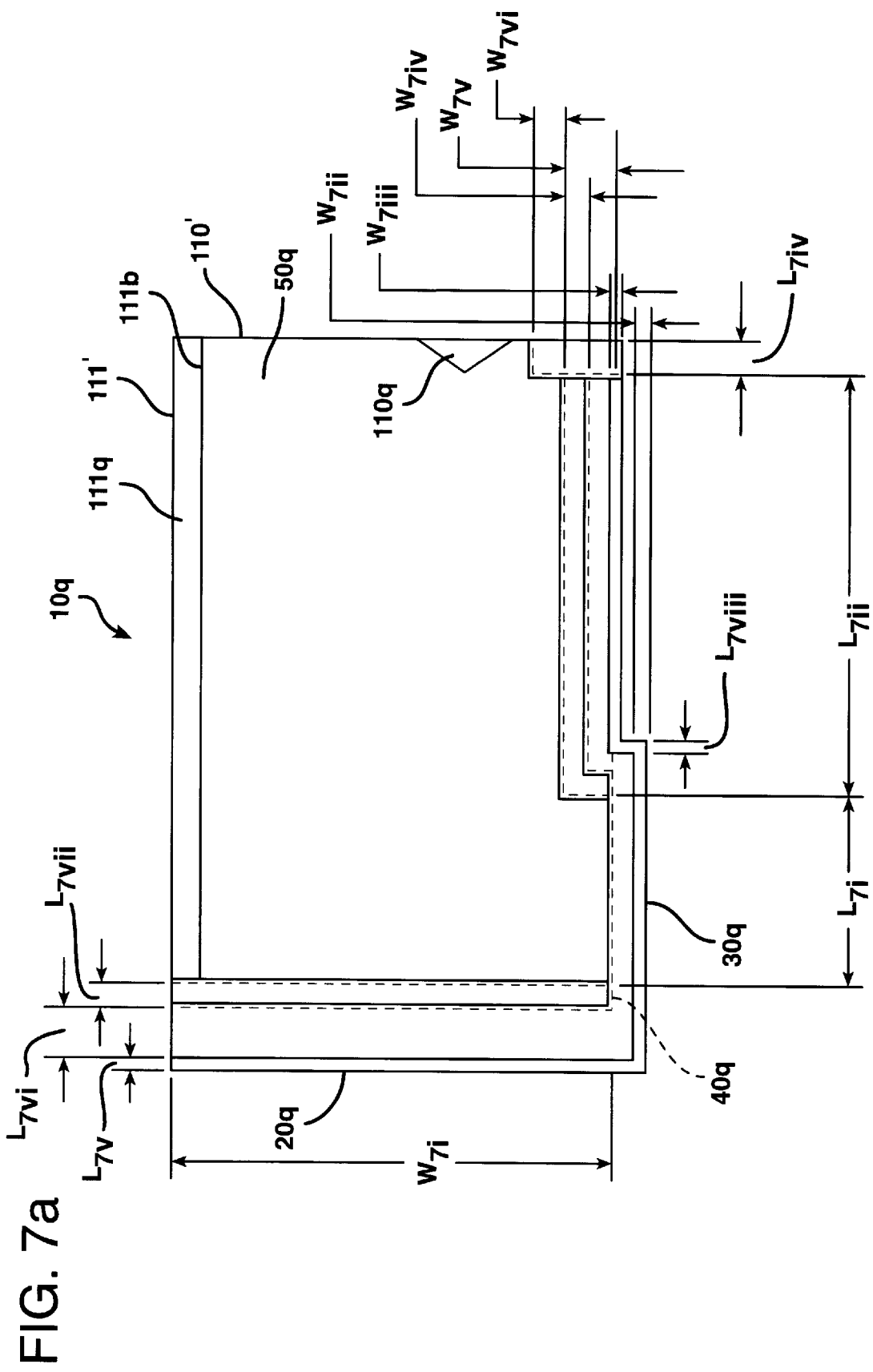
FIG. 7a is a top view of a quadrant of a further embodiment of a container.
Figure 7B:
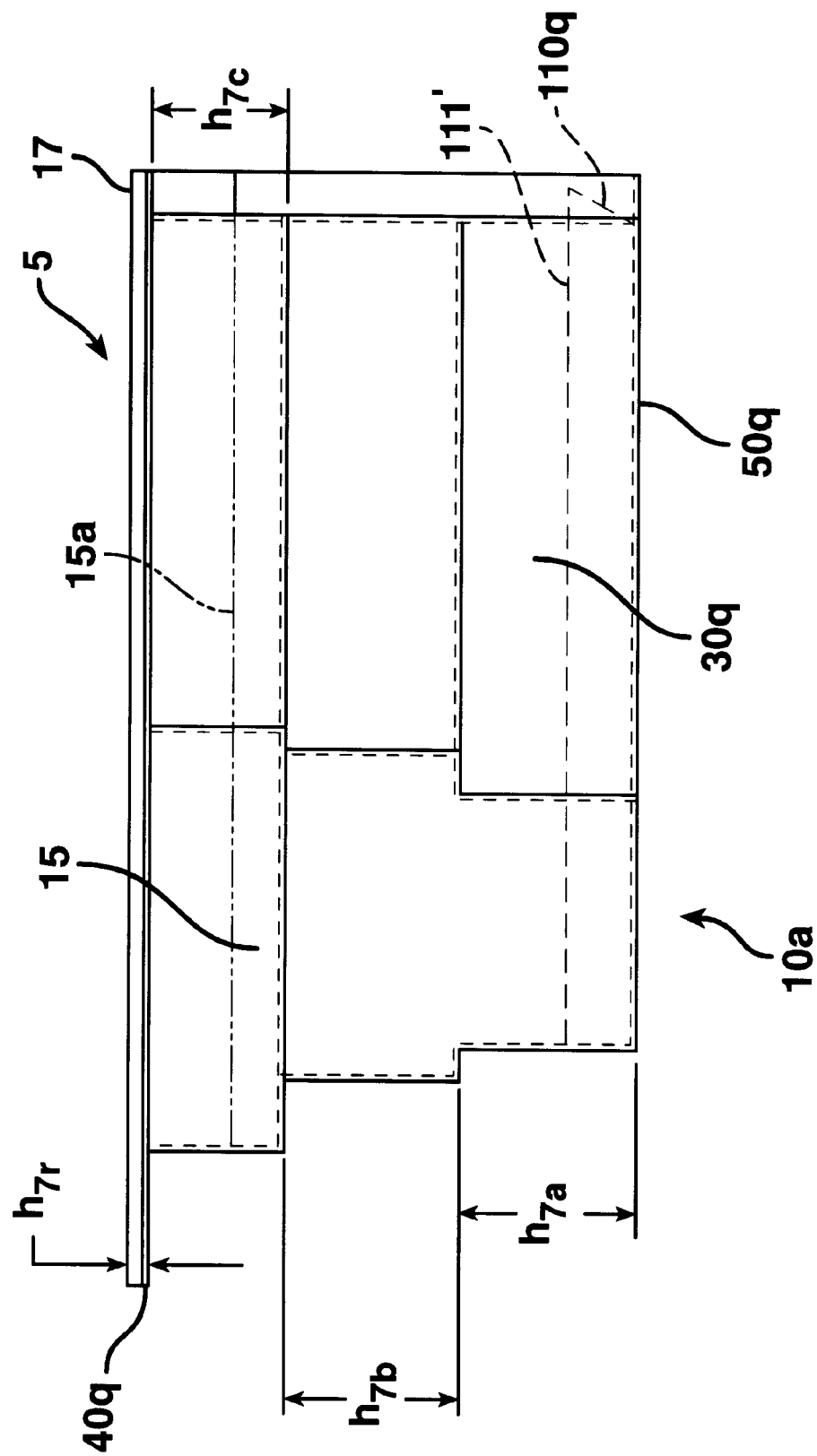

FIGS. 7a and 7b show a portion of an alternative embodiment of a multi-tiered package 5 comprised of container (one broken-apart quadrant, 10q, is shown) and asphalt 15, which is preferably filled to fill line 15a. The container has a break channel 111q, which may extend from one side of the container bottom to another side to allow dividing of the container along its width, such as at a right angle to sides 30q and centered along ends 20q, as depicted in FIGS. 7a and 7b. The break-channel opening has a triangular cross-section with its apex at line 111' angling down to base line 111b on one quadrant bottom 50q and a similar base line of the other side (of the symmetrical quadrant not shown). The container also has a break notch 110q to permit division of the container along its length. Thus, the container can be broken into widthwise or lengthwise halves, as well as into quadrants, such as quadrant 10q shown in FIGS. 7a and 7b, by breaking along both breakage indentations or means 110q and 111q and planes of symmetry (passing through lines 110' and 111' perpendicular to the plane of the sheet of paper containing FIG. 7a). The container has a rim or flange 40q and multi-faceted walls 20q, 30q. Preferred approximate dimensions of a container quadrant 10q are as follows: $h_{7a}$=2.000 inches, $h_{7b}$=2.000 inches, $h_{7c}$=1.500 inches, and $h_{7r}$=0.0727 inch; $W_{7i}$=6.750 inches, $W_{7ii}$=0.250 inch, $W_{7iii}$=0.250 inch, $w_{7iv}$=0.375 inch, $w_{7v}$=0.750 inch, and $W_{7vi}$=0.500 inch; and $l_{7i}$=3.000 inches, $l_{7ii}$=6.750 inches, $l_{7iii}$=0.250 inch, $l_{7iv}$=0.500 inch, $l_{7v}$=0.250 inch, $l_{7vi}$=0.875 inch, and $l_{7vii}$=0.375 inch.

If desired, a cover means 17, generally shown in FIG. 7b, may be provided to cover or enclose the container. For example, a mating lid formed form a consumable asphalt-polymer composition may be used to cover the tops of containers.

In an alternative preferred embodiment, a thin polymeric film that is dissolvable in the asphalt, preferably a polypropylene film having a thickness of from about 1 mil to 4 mils, is used as a cover means 17 for one or more of the containers. For example, a package may include a single container of asphalt placed in a film bag to provide protection, e.g., from rain when the package is stored outdoors. In a preferred embodiment, a polypropylene film may be placed on top of each layer of containers (e.g., nine containers of asphalt per pallet layer).

Figure 8A:
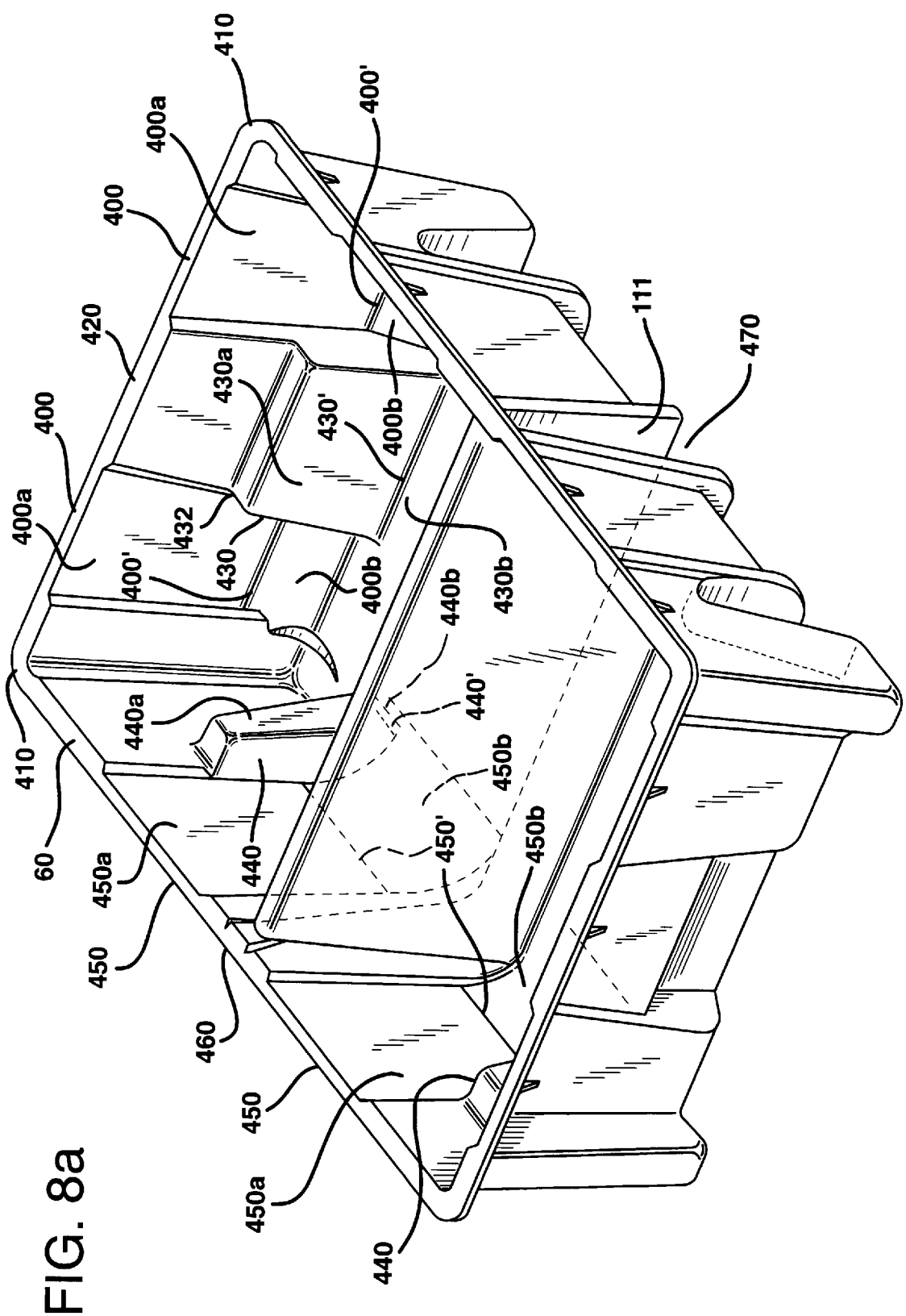
FIG. 8a is a top view of an alternate embodiment of the asphalt container shown in FIG. 1a–1e.
Figure 8C:
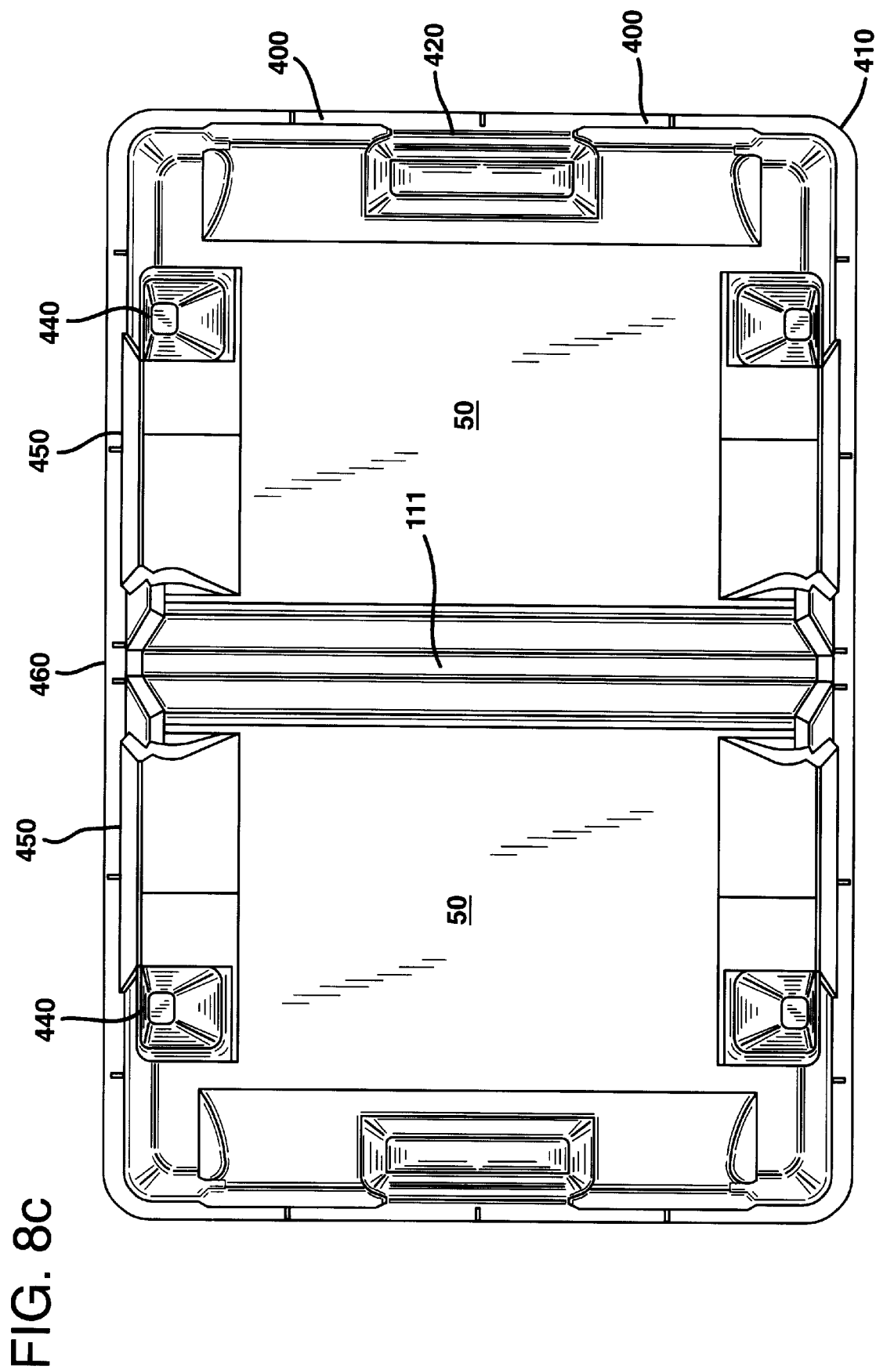

FIGS. 8a–8c show a particularly preferred embodiment of a consumable container having a structure similar to that shown in FIGS. 1a–1e, but having at least one break channel 111 that extends across the width of the container bottom 50 and projects upwardly into the container interior a height of from about 50% to about 95%, more preferably from about 85% to about 95% of the height of the side walls 30. Break channel 111 allows for convenient breakage of the asphalt package into pieces so that less than the entire package can be fed into the melting kettle, and preferably extends to near, or even slightly above, the top of the asphalt in the container. Such containers are particularly useful for packaging highly polymer modified asphalts which can be difficult to break into pieces. Break channel 111 may have any cross-section that will suitably facilitate breaking of the package into pieces; however, triangular, V-shaped or U-shaped cross-sections are generally preferred to facilitate stacking of empty containers.

In this embodiment, the container walls preferably taper outwardly from bottom to top, meet at rounded corner sections or portions, and have inwardly and outwardly recessed sections or portions which help resist bulging or deformation during filling with hot asphalt. For example, each end has several offset surfaces or facets including outwardly recessed wall portions 400 located between each corner portion 410 and central end wall portion 420. Central end wall portion 420, further includes an inwardly recessed lower portion 430 which protrudes into the container interior below the top rim 60 to form a handle. The top 432 of recessed lower portion 430 may be generally flat, curved, or form a pronounced ridge for grasping as shown in FIGS. 1a–1e. The outwardly recessed wall portions 400 and the inwardly recessed lower central wall portion 430 are each formed of a generally flat upper portion 400a and 430a, respectively, that transitions at lines 400' and 430' into lower portions 400b and 430b which curve inwardly until they meet bottom 50.

Additionally, each side contains several offset surfaces or facets including indentations 440, formed in the side walls near each corner section 410, which protrude into the container interior, and an outwardly recessed section or portion 450 between each indentation 440 and a central side wall portion 460 containing notch 470 formed by break channel 111. The depressions permit the container to be grasped easily mechanically, e.g., with large tongs, or by hand. The outwardly recessed side wall sections 450 and the inwardly facing portion of the indentations 440 are each preferably formed of a generally flat upper portion 450a and 440a, respectively, that transitions at lines 450' and 440' into lower portions 460b and 440b which curve inwardly until they meet bottom 50.

Preferably, the container has the following approximate dimensions: overall height of about 6.75 inches; overall width (internal) of about 14.0 inches at top and of about 13.0 inches at the bottom; overall length (internal) of about 21.5 inches at the top and of about 20.5 inches at the bottom; and a flange of about 1.0 inch around the top. The break groove 111 preferably has a cross-section in the shape of an inverted U (considering the gap along the bottom as the base) with a base length along the bottom of from about 1.0 inches to about 7.0 inches and a height of from about 1.0 inches to about 6.0 inches, more preferably a base length of about 2.5 inches and a height of about 4.5 inches.

An asphalt package in accordance with the invention comprises a consumable asphalt container holding raw or processed asphalt, preferably in an amount of from about 30 to about 60 pounds, to be melted and used in an application such as roofing or paving. The terms "asphalt" and "raw or processed asphalt" are meant to include asphalt bottoms from petroleum refineries, as well as naturally occurring bituminous materials such as asphalts, gilsonite, tars, and pitches, or these same materials that have been air-blown or otherwise chemically processed or treated. For example, the asphalt can be air blown with catalysts such as ferric chloride and the like. The asphalt can be a conventional roofing flux asphalt or a paving-grade asphalt, as well as other types of asphalts, including specialty asphalts such as water-proofing asphalts, battery compounds, and sealers. Blends of different kinds of asphalt can also be used. A preferred asphalt has a ring-and-ball softening point higher than about 90° C. This softening point is typically measured according to ASTM D36.

The containers are preferably made from a moldable asphalt-polymer composition comprising, by weight, from about 40% to about 90% of an asphalt material and from about 10% to about 60% of a polymer material. In general, the polymer material of the moldable asphalt composition can be any polymer or mixture of polymers that is compatible with the asphalt and enables the container to have the desired physical properties. Certain types of polymers help provide the container with high toughness and impact resistance, while others help impart high-temperature stability.

Exemplary polymers that may be used as a component of the polymer material include polymers selected from propylene, ethylene-propylene copolymers, and butylene copolymers. In addition, copolymers of acrylates and methacrylates, such as butyl, propyl, ethyl, or methyl acrylate or methacrylate copolymerized with ethylene, propylene, or butylene, can be used. Also, epoxy-functionalized copolymers are useful to improve the impact-resistance and flexibility of the container, for example, a terpolymer of ethylene, butyl acrylate and glycidyl methacrylate, such as Elvaloy AM available from E. I. duPont de Nemours & Co. (Wilmington, Del.). A synthetic rubber can also be used, such as styrene-butadiene-styrene (SBS), styrene-butadiene rubber (SBR), styrene-ethylene-butylene-styrene (SEBS), or terpolymer made from ethylene-propylene diene monomer (EPDM).

Preferably the polymer material includes an ethylene-vinyl acetate (EVA) copolymer with a vinyl acetate content from about 9% to about 40% by weight, so that it is sufficiently soluble in asphalt. Ethylene-vinyl acetate copolymers with a softening point of at least about 150° C. can improve the melt resistance of the container during pouring of the asphalt. Preferred ethylene-vinyl acetate copolymers are the "Elvax" series from DuPont, such as Elvax 360 through 750, preferably Elvax 450 or 470. Ethylene-vinyl acetate copolymers are also available from USI Chemicals under the trade names Ultrathene and Vynathene.

A preferred consumable container composition or material comprises, by weight, from about 5% to about 50% of a polymer for enhancing impact resistance or toughness, more preferably from about 5% to about 25% of this polymer. More preferably the material comprises, by weight, from about 5% to about 15% ethylene-vinyl acetate copolymer, and even more preferably from about 8% to about 12% EVA.

A preferred additional polymer component of the polymer material is one that enhances high-temperature stability, such as polypropylene (PP) having a melting point of 163° C. and a crystallinity of 40%. The moldable asphalt composition comprises, by weight, from about 5% to about 55% of this polymer, more preferably from about 20% to about 40%. Although this polymer by itself is typically not sufficient to provide the moldable asphalt material with the desired toughness and impact resistance, when another polymer such as ethylene-vinyl acetate copolymer is also mixed with the asphalt, the resulting moldable asphalt material has the desired toughness and impact resistance.

When the polymer material includes only one polymer such as polypropylene, the moldable asphalt composition will typically have an unnotched Izod impact strength less than 2.7 joules. In a preferred embodiment, asphalt is combined with EVA and PP polymers so that the composition has an unnotched Izod impact strength of at least 2.7 joules, and preferably at least about 4 joules.

A consumable asphalt-polymer composition is preferably injection-molded to form the containers of the invention. In a general aspect of the invention, the consumable containers have a generally rectangular shape and means for facilitating breakage into two or more portions, such as break notches extending partially across the container bottom or break grooves extending across the container bottom from one side to another.

For a container of roofing asphalt, the weight of the container is preferably kept low as a percentage of the total weight of the asphalt package. A low container weight provides desired softening point, viscosity, penetration, and solubility properties, and keeps the cost low. Preferably the asphalt package comprises, by weight, from about 2% to about 6% container and from about 94% to about 98% raw or processed asphalt, and more preferably from about 2.5% to about 3.5% container and from about 96.5% to about 97.5% asphalt.

In a preferred embodiment, a consumable container according to the invention can be used to package paving asphalt and to reduce fuming of this asphalt when melted. For instance, a package may contain air-blown paving-grade asphalt in the range of from AC-2 to AC-50, more preferably AC-10 or AC-20. For a container for such an asphalt, the amount of polymer material used in the container composition is preferably sufficient to provide a total of from about 1 to about 5% by weight based on the total weight of the package (container plus the asphalt contained therein). A preferred consumable container composition comprises, by weight, from about 40% to about 90% asphalt and from about 10% to about 60% polymer material, in which the material when melted in a kettle or heating vessel causes at least about 25% visual reduction of fumes from the kettle compared to the asphalt alone (without any polymer) when melted in the kettle. The visual reduction of fumes may be measured as a reduction in opacity.

Preferably, the added polymer has a melt flow index from about 15 to about 95 grams/10 minutes, more preferably from about 25 to about 85 grams/10 minutes, and even more preferably from about 35 to about 75 grams/10 minutes. A lower melt flow index generally indicates a more viscous polymer. If the melt flow index is too low, it is difficult to disperse the polymer in the asphalt without agitation. The melt flow index is measured at 190° C. under a 2.16 kg load according to ASTM D1238 Method B. Of course, this parameter, like the other parameters mentioned herein, may be measured by any other suitable test.

In preferred embodiments, the polymer has a relative density lower than that of the asphalt so that it rises to the upper surface of a kettle and form a polymer skim or skin on top of the molten asphalt to reduce fuming. The polymer should be miscible and compatible with the asphalt, without significantly modifying the asphalt in the amount added. Preferably, the polymer material is selected from polypropylenes, ethylene-vinyl acetate copolymers, ethylene-methylacrylate copolymers (EMA), synthetic rubbers such as SBS, SBR, SEBS or EPDM, and mixtures thereof. The ethylene-vinyl acetate copolymer preferably has a vinyl acetate content from about 5% to about 40% by weight, preferably from about 9% to about 28% by weight, so that it is suitably soluble in the asphalt. Other appropriate polymers, and mixtures of such polymers, can also be used.

Preferably, from about 0.25% to about 6% polymer is added by weight of the total asphalt and polymer. For a container for roofing asphalt, more preferably from about 0.5% to about 3%, and even more preferably from about 1% to about 2.5%, polymer is added based on the total weight of asphalt and polymer. For a container for paving-grade asphalt, more preferably from about 1 to about 5% polymer is added based on the total weight of asphalt and polymer.

When the polymer material is added in the form of a consumable container for the asphalt, preferably the polymer is a mixture of from about 50% to about 95% of a first polymer and from about 5% to about 50% of a second polymer, by weight. The first polymer has a melting point of at least about 150° C. to provide high-temperature stability to the container. Exemplary first polymers include thermoplastic polymers that provide high-temperature resistance, such as styrene-acrylonitrile, polybutylene terephthalate, polyurethane, and thermoplastic polyolefins. A preferred first polymer is polypropylene having a melting point of 163° C. and a crystallinity of 40%.

The second polymer is added to provide the container with toughness and impact resistance. Preferably, the second polymer is ethylene-vinyl acetate copolymer having a vinyl acetate content of from about 9% to about 40% by weight. Preferred ethylene-vinyl acetate copolymers are the "Elvax" series from duPont, such as Elvax 265 through 750, and more preferably Elvax 450 or 470. Natural or synthetic rubbers are also useful for the second polymer.

One or more filler materials, such as crushed stone, glass fibers, talc, calcium carbonate, or silica, can be added to the asphalt. Such filler materials would be undesirable in some end uses of packaged asphalt, however. It is to be understood that the filler materials are to be ignored when calculating the percentages of other specified materials in the asphalt; thus, the weight percentages of ingredients given herein are based on total weights of the materials or compositions exclusive of any filler or the like present in the material or composition.

Optionally, non-polymeric chemical modifiers, such as phosphoric acid, may be added to the container composition. This permits the use of one or a few standard asphalts to fill the containers, with the desired chemical additives for optimizing the asphalt for the intended application being added to the asphalt via the container. Thus, consumable asphalt packages may be efficiently produced according to the specifications of each customer.

Molten asphalt may be used as paving asphalt, preferably one that is readily cold-flowable, in accordance with the invention. A consumable container for pavinggrade asphalt is preferably thickwalled (e.g., having walls with a thickness of about 0.28 inches), and may be formed by a process such as rotoforming, thermoforming, or injection molding. The polymer material and/or another ingredient may advantageously enhance the properties of the asphalt for paving purposes, such as high-temperature performance as measured by, e.g., the Federal Highway Association's pending Strategic Highway Research Program (SHRP) specification, when the package is melted. Exemplary polymers for improving asphalt paving properties are EVA, EMA, SBS, and polypropylene. The composition of the container may optionally include one or more fillers, such as organic or inorganic fibers.

Alternatively, molten asphalt made in accordance with the invention may be used as a roofing asphalt. Preferably, the asphalt without (before addition on the polymer meets the requirements for at least one type of roofing asphalt according to ASTM D312, more particularly ASTM D312-89. It is preferred that the addition of the polymer to the asphalt reduces fuming but does not significantly change the properties of the asphalt. Consequently, the asphalt with the added polymer preferably also meets the requirements for at least one type of roofing asphalt according to ASTM D312. More preferably, the asphalt with the added polymer meets the following ASTM D312 specifications for a Type III roofing asphalt: softening point (by ASTM D36) of 85–96° C.; flash point of 246° C. minimum; penetration (by ASTM D5) at 0° C. of 6 dmm minimum, at 25° C. of 15–35 dmm, and at 46° C. of 90 dmm maximum; ductility (by ASTM D-113) at 25° C. of 2.5 cm minimum; and solubility (by ASTM D2042) in trichloroethylene of at least 99%. Preferably the addition of the polymer to the asphalt does not change the softening point of the asphalt by more than about 9° C., more preferably not more than about 3° C., and does not change the penetration of the asphalt by more than about 10 dmm at 25° C. A preferred roofing-asphalt package weighs about 60 lbs. (27.2 kg) and includes a container of the invention holding Type III ASTM D312-89 asphalt.

An especially preferred consumable composition for forming the containers consists essentially of about 60 weight percent AC-20 asphalt blown to 250° F. softening point (available from Owens-Corning Trumbull), about 30 weight percent of polypropylene 6301, which is a 12 grams/minute melt-flow homopolymer available from Montel (Lake Charles, La.), and about 10 weight percent EVA (DuPont Elvax 450, 18% vinylacetate). However, for articles intended for use in connection with roofing applications wherein solubility in trichlorethylene pursuant to ASTM D312 is preferred, polypropylene that has been modified or "grafted" with a polar monomer such as maleic anhydride, acrylic or methacrylic acid, or an ester thereof may be particularly useful. The polar monomer is preferably present at a level of from about 0.1% to about 10% by weight, more preferably, from about 0.3% to about 1.0%.

The consumable asphalt-polymer compositions are preferably injection molded to form the containers of the invention. The molded containers are filled with molten asphalt, which is allowed to solidify by cooling, preferably using cooled or ambient air.

Although the invention has been described in detail in reference to preferred features and embodiments, appropriate modifications will become apparent to the artisan. For instance, the container dimensions and configurations of various features may be suitably varied. Side or end recesses, which may be single- or multi-faceted with planar or curved surfaces, may extend all the way up to the top perimeter of the container to help further reduce deformation upon filling. Thus, the invention is intended not to be limited by the foregoing description, but to be defined by the appended claims and their equivalents.

What is claimed is:

1. An asphalt package comprising:
   (a) a container made from a consumable composition comprising an asphalt material and a polymer material, the container having a structure comprising (i) a bottom having opposing side edges and opposing end edges, (ii) a pair of side walls extending up from the side edges of the bottom and connecting (iii) a pair of end walls extending up from the end edges of the bottom to define a top perimeter, the bottom, side walls and end walls defining a container interior, and (iv) at least one indented breakage channel extending from one side wall to the opposing side wall and projecting upward into the container interior a height of from about 50% to about 95% of the height of said side walls; and
   (b) asphalt in the container interior.

2. An asphalt package as defined in claim 1, wherein said side walls have notches formed therein below their intersection with said breakage channel, of a shape defined by said intersection.

3. An asphalt package as defined in claim 2, wherein said breakage channel has a v-shaped cross-section.

4. An asphalt package as defined in claim 2, wherein said breakage channel has a U-shaped cross section.

5. An asphalt package as defined in claim 2, wherein said breakage channel extends upwardly a height of from about 85% to about 95% of the height of said side walls.

6. An asphalt package as defined in claim 2, wherein said breakage channel extends upwardly above the top of said asphalt in said container.

7. An asphalt package as defined in claim 1, wherein said side walls and said end walls comprise a plurality of stepped tiers including a top tier and one or more lower tiers, said top tier overhanging said one or more lower tiers.

8. An asphalt package as defined in claim 1, wherein each of said end walls includes a recessed end surface centered widthwise and having a quadrilateral shape, the recessed end surface extending from the bottom to a point below the top perimeter of the container thereby defining a handhold portion between the top perimeter and the recessed end surface.

9. An asphalt package as defined in claim 8, wherein said handhold portion comprises an outer channel opening toward the top perimeter and an inner channel opening toward the bottom.

10. An asphalt package as defined in claim 1, wherein said end walls include horizontal handhold portions and said side walls include vertical handhold portions.

11. An asphalt package as defined in claim 1, further comprising: (c) a film made of a polymeric material covering the asphalt in the container.

12. An asphalt package as defined in claim 11, wherein said film has a thickness of from 1 mil to 4 mils, and said polymeric material comprises polypropylene.

13. An asphalt package as defined in claim 1, wherein said container comprises polypropylene and ethylene-vinylacetate copolymer.

14. An asphalt package as defined in claim 1, wherein said container comprises polypropylene and styrene-ethylene-butylene-styrene synthetic rubber.

15. An asphalt package as defined in claim 13, wherein said polypropylene has been grafted with a polar monomer selected from the group consisting of maleic anhydride, acrylic or methacrylic acid, or an ester thereof.

16. An asphalt package as defined in claim 14, wherein said polypropylene has been grafted with a polar monomer selected from the group consisting of maleic anhydride, acrylic or methacrylic acid, or an ester thereof.

17. An asphalt package as defined in claim 1, wherein said container structure further comprises (v) a rim extending outwardly around the top perimeter.

18. An asphalt package as defined in claim 17, wherein said container structure further comprises (vi) a plurality of spaced-apart ribs extending from the rim to the side walls and a plurality of spaced-apart ribs extending from the rim to the end walls.

19. An asphalt package comprising: (a) a container comprising (i) a bottom having opposing side edges and opposing end edges, (ii) a pair of side walls extending up from the side edges of the bottom and connecting (iii) a pair of end walls extending up from the end edges of the bottom to define a top perimeter, the bottom, side walls and end walls defining a container interior, and (iv) at least one indented breakage channel extending upward into the container interior a height of from about 50% to about 95% of the height of said side walls; and (b) further comprising asphalt in the container interior.

20. An asphalt package as defined in claim 19, wherein said breakage channel extends into the container interior a height of from about 85% to about 95% of the height of said side walls.

* * * * *